US012611996B2

(12) United States Patent
Schwarz

(10) Patent No.: US 12,611,996 B2
(45) Date of Patent: Apr. 28, 2026

(54) GEARSHIFT SMARTPHONE MOUNT DEVICE

(71) Applicant: Brendan Schwarz, San Clemente, CA (US)

(72) Inventor: Brendan Schwarz, San Clemente, CA (US)

( * ) Notice: Subject to any disclaimer, the term of this patent is extended or adjusted under 35 U.S.C. 154(b) by 327 days.

(21) Appl. No.: 18/537,338

(22) Filed: Dec. 12, 2023

(65) Prior Publication Data

US 2025/0187550 A1     Jun. 12, 2025

(51) Int. Cl.
B60R 11/02          (2006.01)
B60R 11/00          (2006.01)

(52) U.S. Cl.
CPC ... B60R 11/0241 (2013.01); *B60R 2011/0007* (2013.01); *B60R 2011/007* (2013.01)

(58) Field of Classification Search
CPC ............................ B60R 11/02; B60R 11/0241
See application file for complete search history.

(56) References Cited

U.S. PATENT DOCUMENTS

| | | | |
|---|---|---|---|
| 6,058,797 A | 5/2000 | Konig | |
| 9,079,545 B2 * | 7/2015 | Dugan | .................... B60R 11/02 |

| | | | |
|---|---|---|---|
| D781,191 S | 3/2017 | Webb | |
| D825,548 S | 8/2018 | Lebovitz | |
| 10,703,297 B1 | 7/2020 | Cohen | |
| 10,793,082 B2 * | 10/2020 | Harris | ................. B60R 11/0241 |
| 11,242,012 B1 | 2/2022 | Bell | |
| 2012/0168482 A1 * | 7/2012 | Dugan | .................... B60R 11/02 |
| | | | 224/567 |
| 2016/0106202 A1 | 4/2016 | Ford | |
| 2019/0210542 A1 * | 7/2019 | Harris | ..................... B60R 11/02 |
| 2025/0187550 A1 * | 6/2025 | Schwarz | ............. B60R 11/0241 |

FOREIGN PATENT DOCUMENTS

| | | |
|---|---|---|
| WO | WO2016064185 | 4/2016 |

* cited by examiner

*Primary Examiner* — Patrick F Marinelli

(57) ABSTRACT

A gearshift smartphone mount device includes a first panel that is structured to have a stem portion extending downwardly from a knob portion. A second panel is structured to have a stem portion extending downwardly from a knob portion and the second panel is attachable to the first panel such that the first panel and the second panel define a gear shift knob. A shaft channel in the first panel is aligned with a shaft channel in the second panel to defines a hole which insertably receives a gear shift shaft of a vehicle. A magnet is integrated into the first panel and the second panel and the magnet magnetically engages a personal electronic device to facilitate the personal electronic device to be visible to a driver of the vehicle.

17 Claims, 8 Drawing Sheets

GEARSHIFT SMARTPHONE MOUNT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to smartphone mount devices and more particularly pertains to a new smartphone mount device for mounting a smartphone to a gear shift lever in a vehicle. The device includes a first panel and a second panel that are attachable together to form a gear shift knob that can be threaded onto a gear shift shaft of a vehicle. The device includes a magnet that is integrated into the gear shift knob which magnetically engages a smartphone when the smartphone is placed on the gear shift knob.

(2) Description of Related Art Including Information Disclosed Under 37 CFR 1.97 and 1.98

The prior art relates to smartphone mount devices includes a variety of smartphone mounts that each has magnets that magnetically engages a smartphone and a variety of gear shift knobs. In no instance does the prior art disclose a pair of panels that are attachable together to form a gear shift knob that is attachable to a gear shift shaft and a magnet integrated into the gear shift knob which magnetically engages a smartphone for mounting the smart phone to the gear shift knob.

BRIEF SUMMARY OF THE INVENTION

An embodiment of the disclosure meets the needs presented above by generally comprising a first panel that is structured to have a stem portion extending downwardly from a knob portion. A second panel is structured to have a stem portion extending downwardly from a knob portion and the second panel is attachable to the first panel such that the first panel and the second panel define a gear shift knob. A shaft channel in the first panel is aligned with a shaft channel in the second panel to defines a hole which insertably receives a gear shift shaft of a vehicle. A magnet is integrated into the first panel and the second panel and the magnet magnetically engages a personal electronic device to facilitate the personal electronic device to be visible to a driver of the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
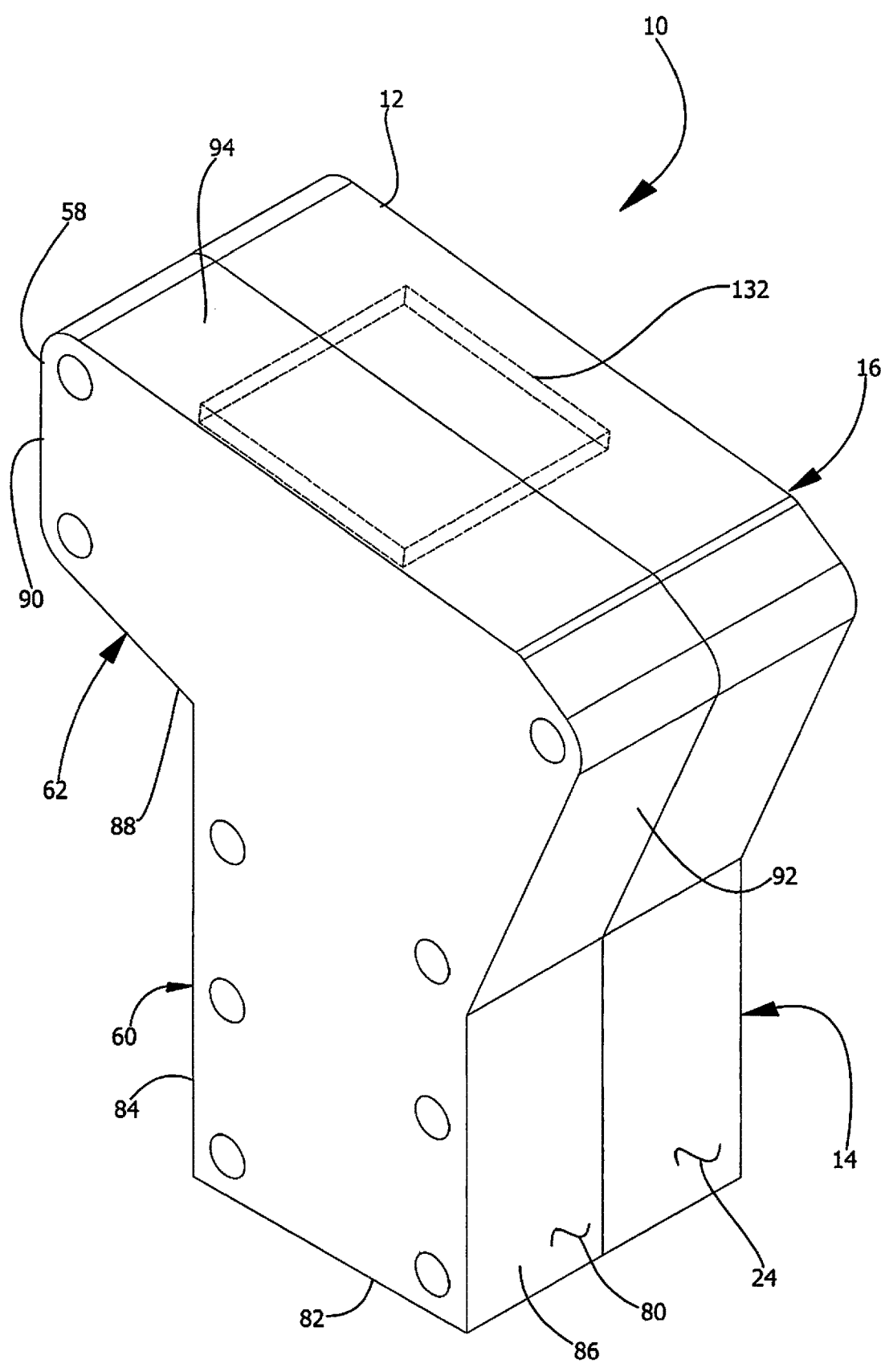
FIG. 1 is a perspective view of a gearshift smartphone mount device according to an embodiment of the disclosure.
Figure 2:
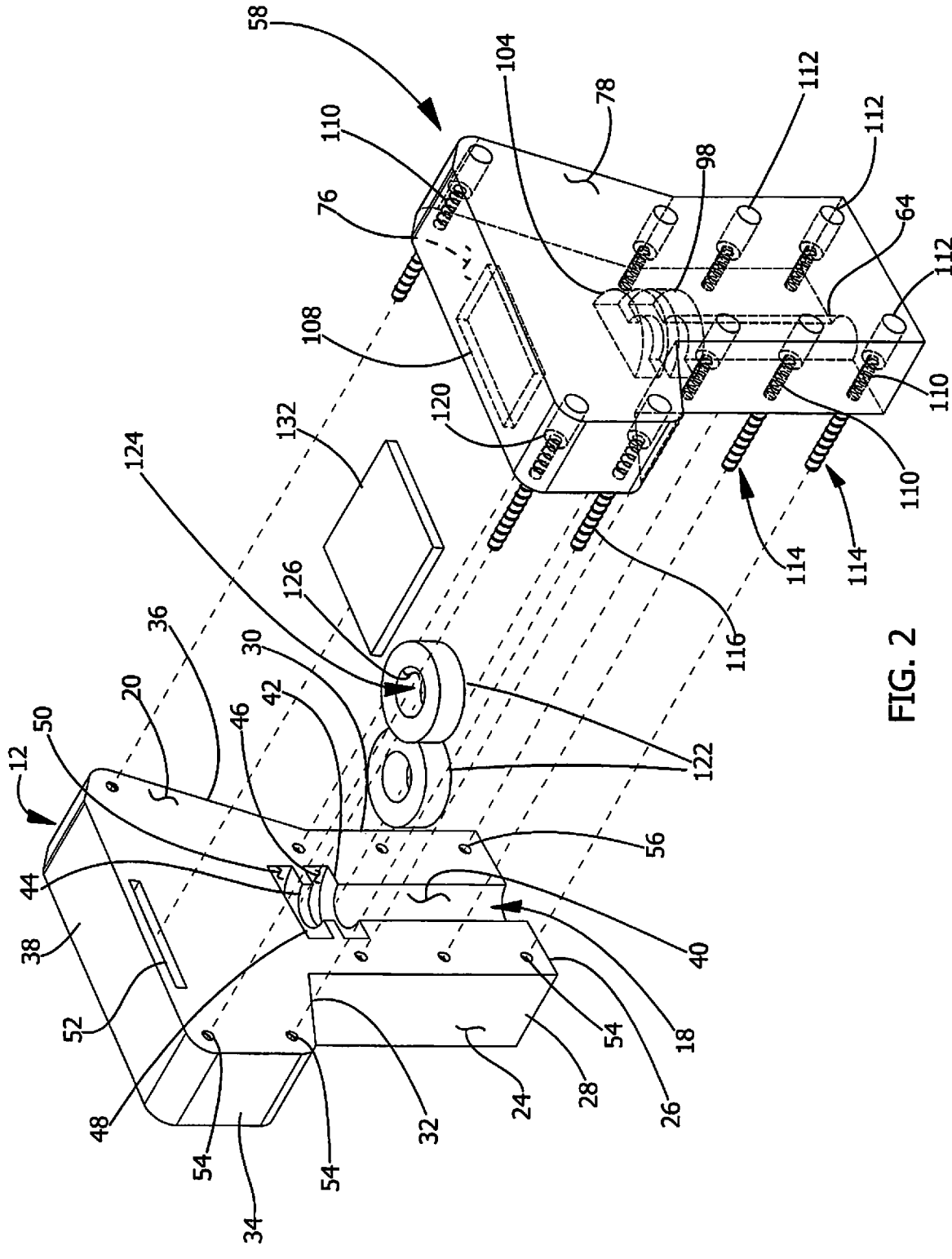
FIG. 2 is an exploded perspective view of an embodiment of the disclosure.
Figure 3:
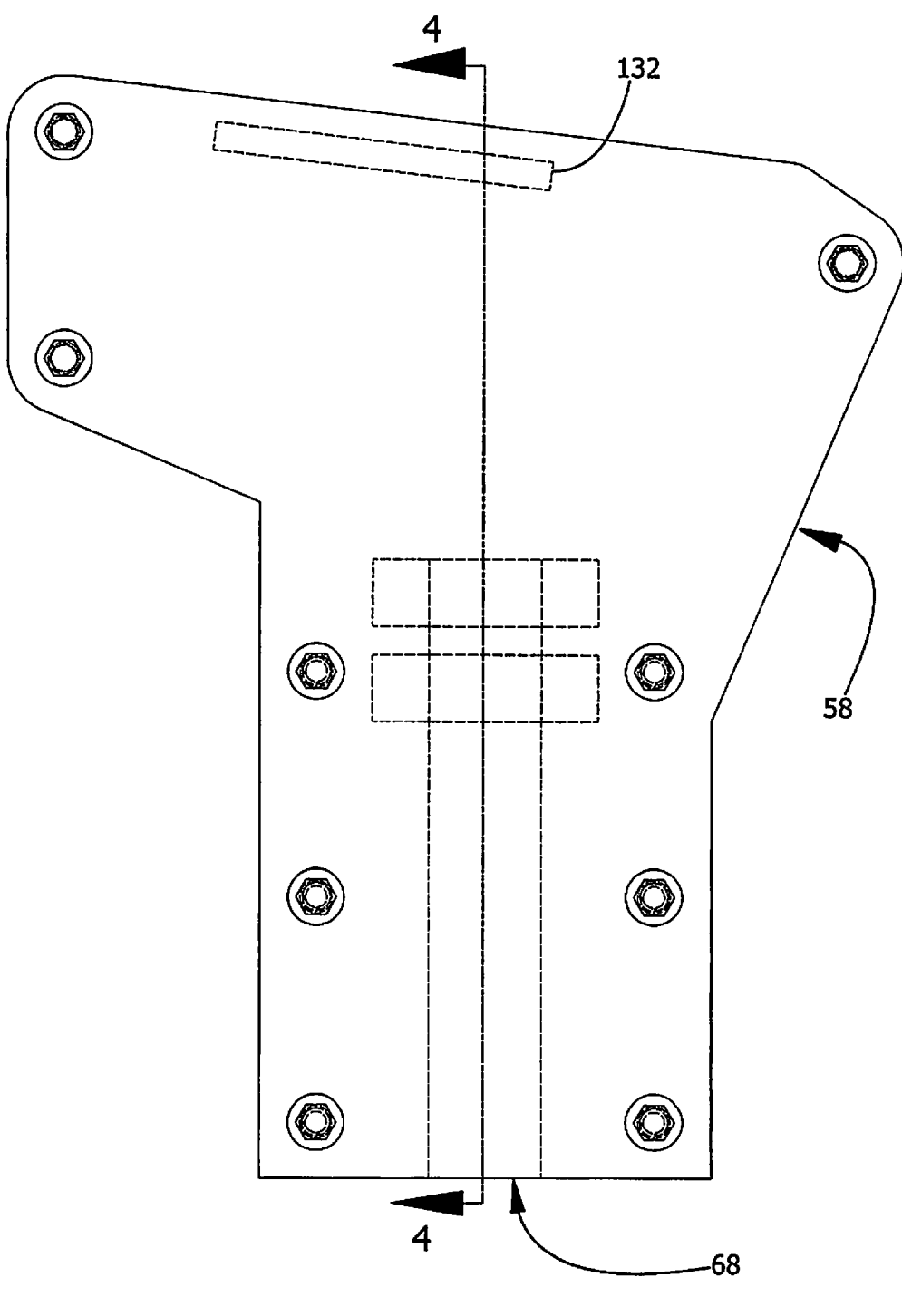
FIG. 3 is a left side phantom view of an embodiment of the disclosure.
Figure 4:
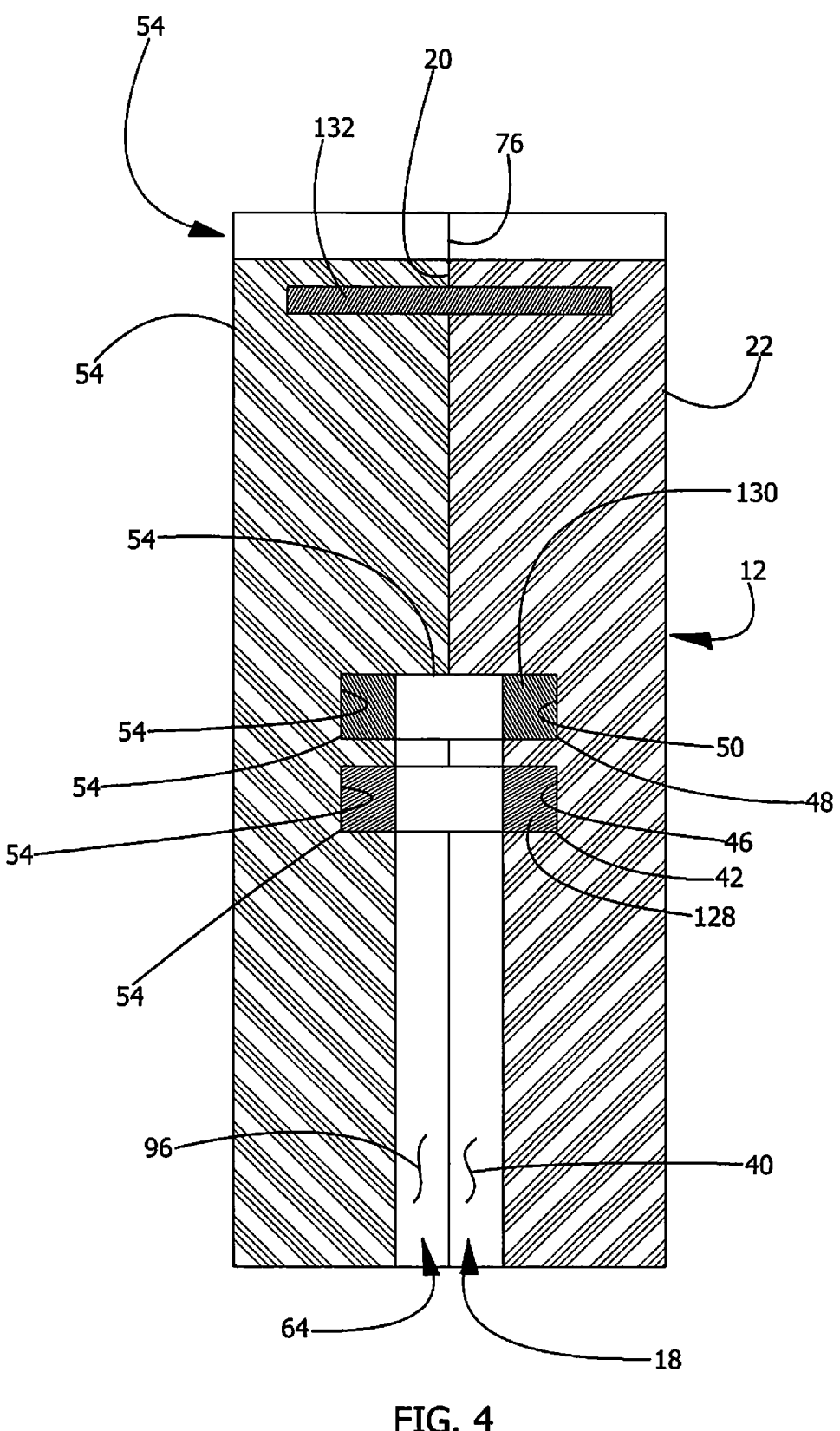
FIG. 4 is a cross sectional view taken along line 4-4 of FIG. 3 of an embodiment of the disclosure.
Figure 5:
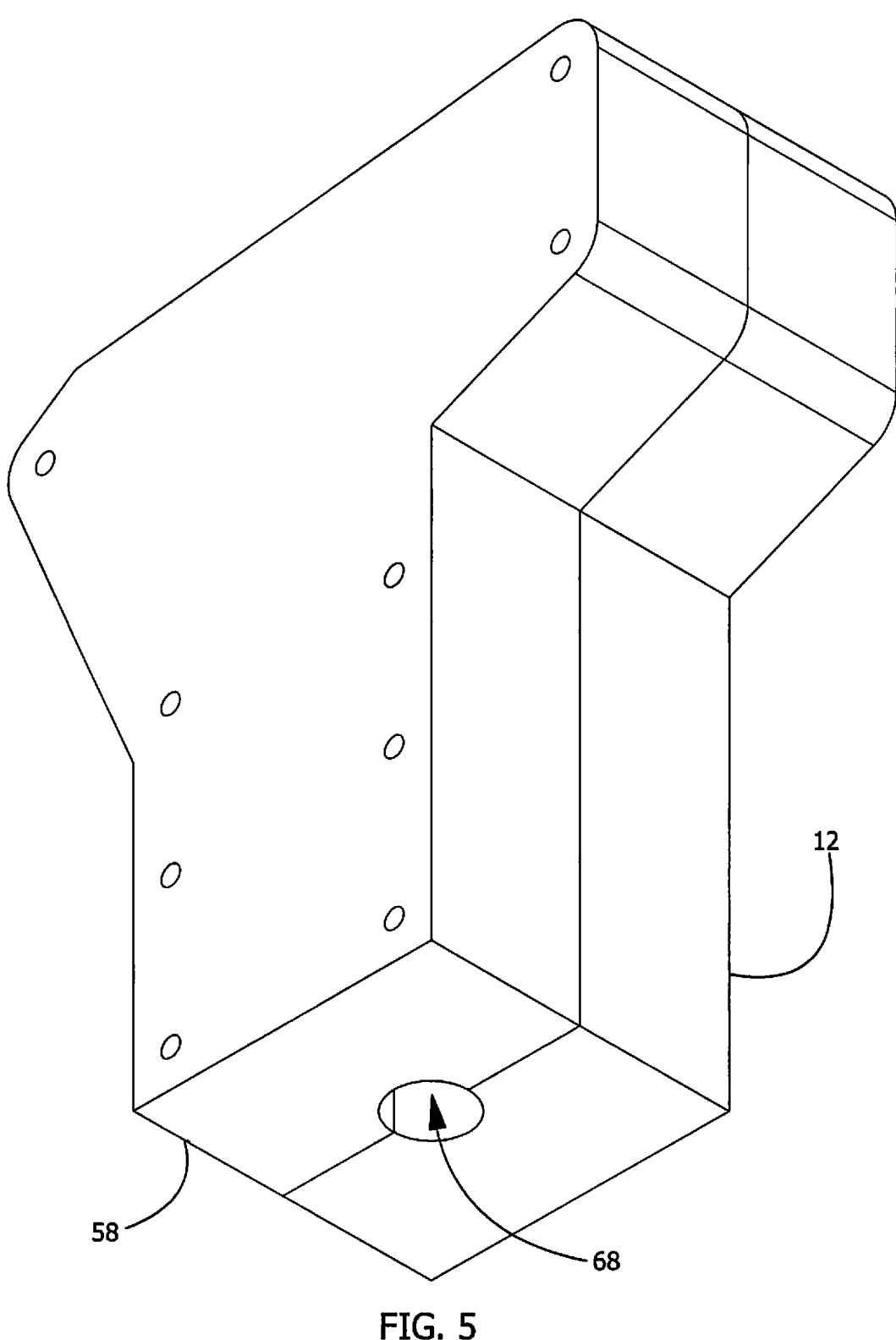
FIG. 5 is a bottom perspective view of an embodiment of the disclosure.
Figure 6:
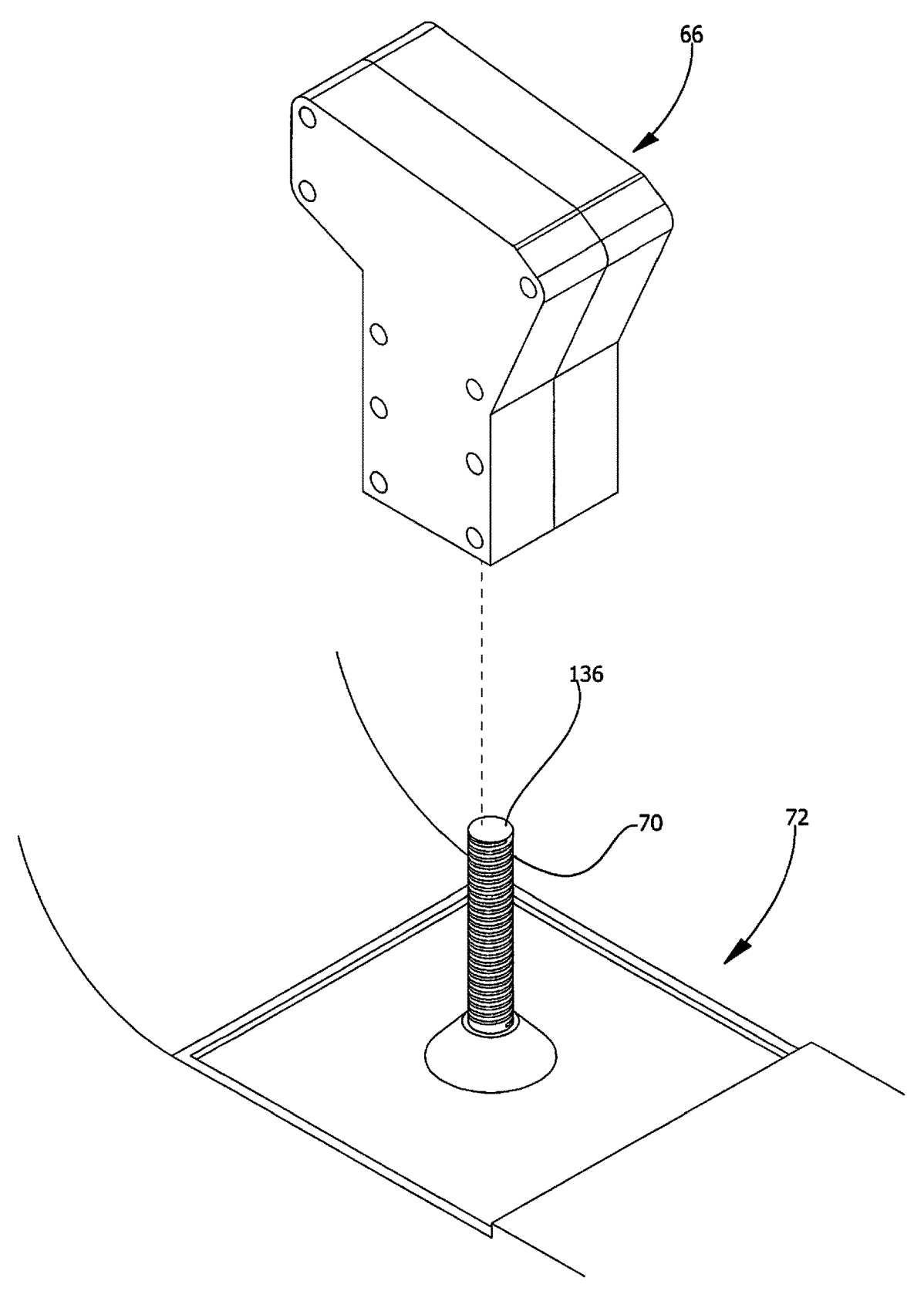
FIG. 6 is a perspective in-use view of an embodiment of the disclosure showing a gear shift knob being placed on a gear shift shaft.
Figure 7:
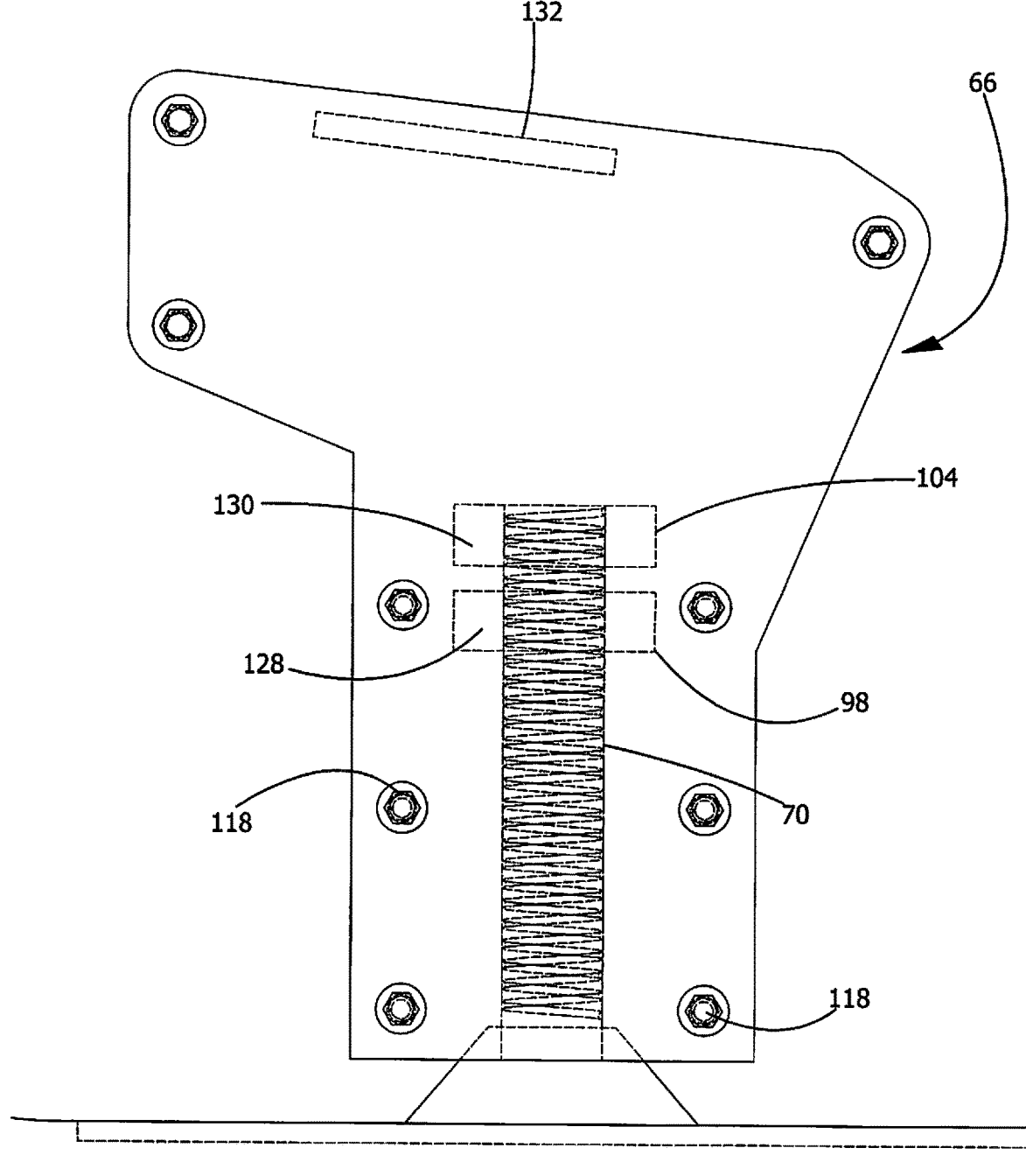
FIG. 7 is a phantom in-use view of an embodiment of the disclosure showing a gear shift knob being attached to a gear shift shaft.
Figure 8:
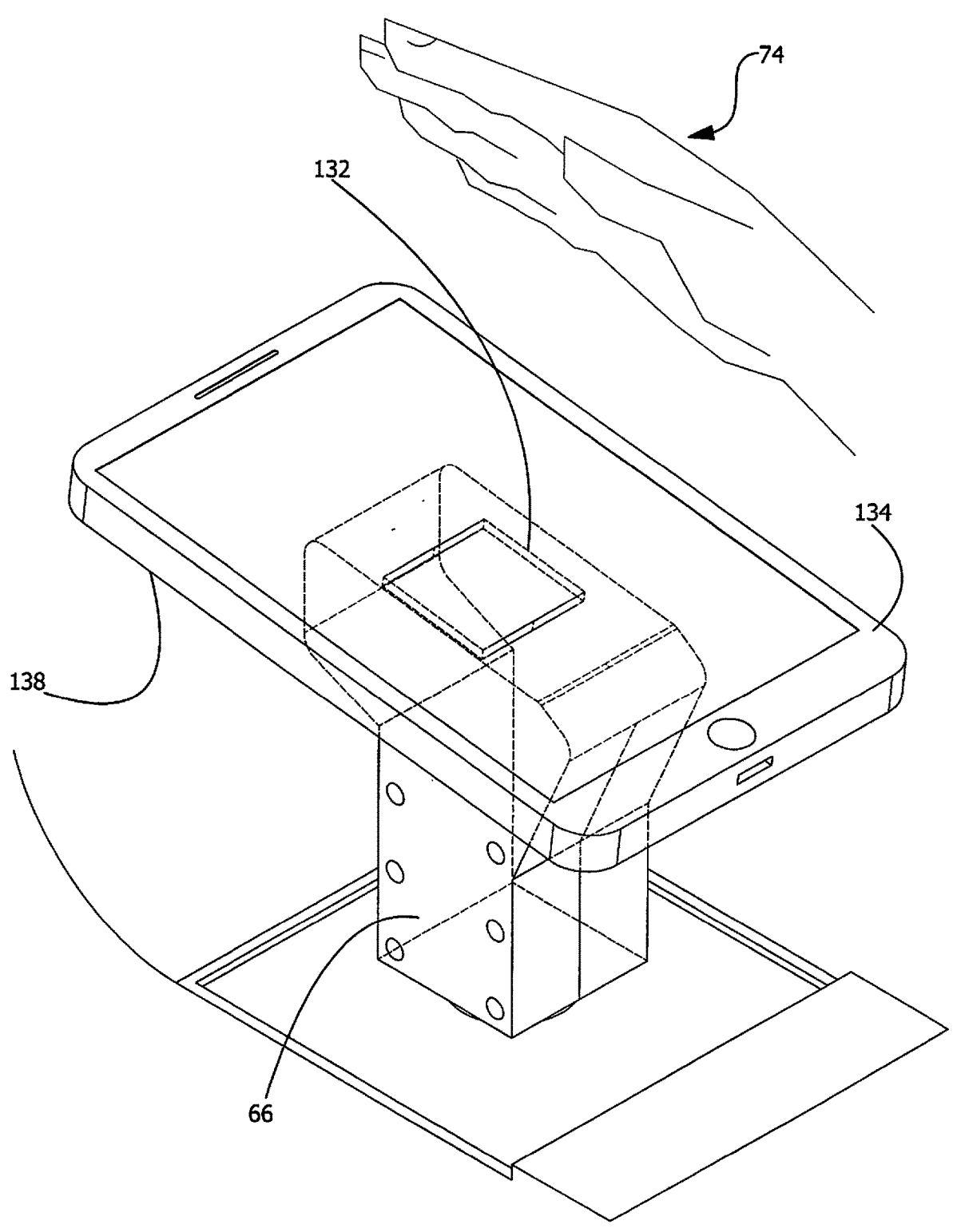
FIG. 8 is a phantom in-use view of an embodiment of the disclosure showing a personal electronic device being mounted in a gear shift knob.

With reference now to the drawings, and in particular to FIGS. 1 through 8 thereof, a new smartphone mount device embodying the principles and concepts of an embodiment of the disclosure and generally designated by the reference numeral 10 will be described.

As best illustrated in FIGS. 1 through 8, the gearshift smartphone mount device generally comprises a first panel 12 that is structured to have a stem portion 14 extending downwardly from a knob portion 16 and a shaft channel 18 that is integrated into the stem portion 14. The first panel 12 has a first lateral surface 20, a second lateral surface 22 and an outer surface 24 extending between the first lateral surface 20 and the second lateral surface 22. The outer surface 24 has a lower side 26 that is perpendicularly oriented with each of a first front side 28 and a back side 30 such that lower side 26 and the first front side 28 and the back side 30 defines the stem portion 14. The outer surface 24 has a first angled side 32 which slopes upwardly between the first front side 28 and a second front side 34 of the outer surface 24. The second front side 34 lies on a plane that is oriented parallel to the first front side 28.

The outer surface 24 has a second angled side 36 that angles upwardly between the back side 30 and a top side 38 of the outer surface 24. The second front side 34 intersects the top side 38 such that the second front side 34 is perpendicularly oriented with the top side 38. The first angled side 32, the second front side 34, the top side 38 and the second angled side 36 defines the knob portion 16. The shaft channel 18 is recessed into the first lateral surface 20 and the shaft channel 18 extends from the lower side 26 toward the knob portion 16. The shaft channel 18 is centrally positioned between the first front side 28 and the back side 30 and the shaft channel 18 has a bounding surface 40 that is concavely arcuate with respect to the first lateral surface 20.

The first panel 12 has a first recess 42 which extends into the first lateral surface 20. The first recess 42 intersects the shaft channel 18 at a point that is spaced from a terminal end 44 of the shaft channel 18. The first recess 42 has a width is greater than a width of the shaft channel 18 and the first recess 42 has a bounding surface 46 that is concavely arcuate with respect to the first lateral surface 20. The first panel 12 has a second recess 48 extending into the first lateral surface 20. The second recess 48 intersects the terminal end 44 of the shaft channel 18 such that the second recess 48 is oriented parallel to the first recess 42. Additionally, the second recess 48 has a bounding surface 50 that is concavely arcuate with respect to the first lateral surface 20.

The first panel 12 has a well 52 which extends into the first lateral surface 20 and the well 52 is positioned closer to the top side 38 of the outer surface 24 than the second recess 48. The well 52 is oriented to extend along a line that is oriented parallel to the top side 38. The first panel 12 has a plurality of fastener wells 54 extending into the first lateral surface 20. The fastener wells 54 are spaced apart from each other and are distributed around the outer surface 24 and each of the plurality of fastener wells 54 has a bounding surface 56 that is threaded.

A second panel 58 is provided and the second panel 58 is structured to have a stem portion 60 extending downwardly from a knob portion 62. The second panel 58 has a shaft channel 64 that is integrated into the stem portion 60 of the second panel 58. The second panel 58 is attachable to the first panel 12 such that the first panel 12 and the second panel 58 define a gear shift knob 66. The shaft channel 18 in the first panel 12 is aligned with the shaft channel 64 in the second panel 58 when the first panel 12 is attached to the second panel 58 such that the shaft channel 18 in the first panel 12 and the shaft channel 64 in the second panel 58 defines a hole 68. In this way the hole 68 can insertably receive a gear shift shaft 70 of a vehicle 72 thereby facilitating the knob portion of the first panel 12 and the knob portion of the second panel 58 to be gripped by a driver 74 of the vehicle 72 for shifting gears.

The second panel 58 has a primary lateral surface 76, a secondary lateral surface 78 and an outside surface 80 extending between the primary lateral surface 76 and the secondary lateral surface 78. The outside surface 80 has a bottom side 82 that is perpendicularly oriented with each of a primary front side 84 and a rear side 86 such that bottom side 82 and the primary front side 84 and the rear side 86 defines the stem portion 60 of the second panel 58. The outside surface 80 has a primary angled side 88 sloping upwardly between the primary front side 84 and a secondary front side 90 of the outside surface 80. The secondary front side 90 lies on a plane that is oriented parallel to the primary front side 84.

The outside surface 80 has a secondary angled side 92 angling upwardly between the rear side 86 and an upper side 94 of the outside surface 80. The secondary front side 90 intersects the upper side 94 such that the secondary front side 90 is perpendicularly oriented with the upper side 94. The primary angled side 88, the secondary front side 90, the upper side 94 and the secondary angled side 92 define the knob portion 62 of the second panel 58. The shaft channel 64 in the second panel 58 is recessed into the primary lateral surface 76 and the shaft channel 64 in the second panel 58 extends from the bottom side 82 toward the knob portion 62 of the second panel 58. The shaft channel 64 in the second panel 58 is centrally positioned between the primary front side 84 and the rear side 86. Furthermore, the shaft channel 64 in the second panel 58 has a bounding surface 96 that is concavely arcuate with respect to the primary lateral surface 76.

The second panel 58 has a primary recess 98 extending into the primary lateral surface 76. The primary recess 98 intersects the shaft channel 64 in the second panel 58 at a point that is spaced from a terminal end 100 of the shaft channel 64 in the second panel 58. The primary recess 98 has a width that is greater than a width of the shaft channel 64 in the second panel 58. Additionally, the primary recess 98 has a bounding surface 102 that is concavely arcuate with respect to the primary lateral surface 76. The second panel 58 has a secondary recess 104 extending into the primary lateral surface 76 and the secondary recess 104 intersects the terminal end 100 of the shaft channel 64 in the second panel 58 such that the secondary recess 104 is oriented parallel to the primary recess 98. The secondary recess 104 has a bounding surface 106 that is concavely arcuate with respect to the primary lateral surface 76.

The second panel 58 has a well 108 extending into the primary lateral surface 76. The well 108 in the second panel 58 is positioned closer to the upper side 94 of the outside surface 80 than the secondary recess 104. Furthermore, the well 108 in the second panel 58 is oriented to extend along a line that is oriented parallel to the upper side 94. The first lateral surface 20 of the first panel 12 rests against the primary lateral surface 76 of the second panel 58 when the first panel 12 is attached to the second panel 58. The primary recess 98 is aligned with the first recess 42 when the first panel 12 is attached to the second panel 58 and the secondary recess 104 is aligned with the second recess 48 when the first panel 12 is attached to the second panel 58. Additionally, the well 52 in the first panel 12 is aligned with the well 108 in the second panel 58 when the first panel 12 is attached to the second panel 58.

The second panel 58 has a plurality of first fastener wells 110 extending into the primary lateral surface 76. The first fastener wells 110 are spaced apart from each other and are distributed around the outside surface 80. Additionally, each of the first fastener wells 110 is aligned with a respective one of the fastener wells 54 in the first panel 12 when the first panel 12 is attached to the second panel 58. The second panel 58 has a plurality of second fastener wells 112 extending into the secondary lateral surface 78 and each of the second fastener wells 112 intersects a respective one of the first fastener wells 110. Additionally, each of the second fastener wells 112 has a diameter that is greater than a diameter of the respective first fastener well 110.

A plurality of fasteners 114 is provided and each of the plurality of fasteners 114 has a shaft 116 that is threaded and a head 118. The shaft 116 associated with each of the plurality of fasteners 114 threadably engages the bounding surface 56 of a respective one of the plurality of fastener wells 54 in the first panel 12 when the plurality of fasteners 114 is extended through a respective pair of the second fastener wells 112 and the primary fastener wells 54. Furthermore, the head 118 associated with each of the plurality of fasteners 114 abuts a threshold 120 between the respective pair of the second fastener well 112 and the first fastener well 110 thereby compressing the second panel 58 against the first panel 12.

A pair of washers 122 is provided and each of the washers 122 has an opening 124 which has a bounding surface 126 that is threaded; the pair of washers 122 includes a first washer 128 and a second washer 130. The first washer 128 is positioned in the first recess 42 in the first panel 12 and the primary recess 98 in the second panel 58 when the first panel 12 is attached to the second panel 58. Additionally, the opening 124 in the first washer 128 is aligned with the hole 68 defined by the shaft channel 18,64 in each of the first panel 12 and the second panel 58. The second washer 130 is positioned in the second recess 48 in the first panel 12 and the secondary recess 104 in the second panel 58 when the first panel 12 is attached to the second panel 58. Furthermore, the opening 124 in the second washer 130 is aligned with the opening 124 in the first washer 128.

A magnet 132 is integrated into the first panel 12 and the second panel 58 when the first panel 12 is attached to the second panel 58. The magnet 132 magnetically engages a personal electronic device 134 when the personal electronic device 134 is placed on top of the gear shift knob 66 defined by the first panel 12 and the second panel 58. In this way the magnet 132 facilitates the personal electronic device 134 to be visible to a driver 74 of the vehicle 72. The personal electronic device 134 may be a smart phone or other similar type of electronic device that has a display which is commonly employed for navigation assistance in a vehicle and the driver 74 may be a driver—for-hire that is transporting one or more passengers. The magnet 132 is positioned in the well 52 in the first panel 12 and the well 108 in the second panel 58. Additionally, the magnet 132 lies on a plane that is oriented parallel to the top side 38 of the outer surface 24 of the first panel 12 and the upper side 94 of the outside surface 80 of the second panel 58.

In use, the gear shift shaft 70 is inserted into the hole 68 defined by the shaft channel 18 in the first panel 12 and the shaft channel 64 in the second panel 58 such that a threaded end 136 of the gear shift shaft 70 threadably engages the bounding surface 126 of the opening 124 in each of the pair of washers 122. In this way the gear shift knob 66 defined by the first panel 12 and the second panel 58 is attached to the gear shift shaft 70. The personal electronic device 134 is laid on top of the gear shift knob 66 such that the magnet 132 magnetically engages a back side 138 of the personal electronic device 134. In this way the personal electronic device 134 is retained in an orientation to facilitate the personal electronic device 134 to be visible to the driver 74. Furthermore, the magnet 132 facilitates any style and design of personal electronic device 134 to be retained on the gear shift knob 66 thereby facilitating universal compatibility with personal electronic devices.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A gearshift smartphone mount device for mounting a smartphone to a gearshift lever in an automobile, said device comprising:

a first panel being structured to have a stem portion extending downwardly from a knob portion, said first panel having a shaft channel being integrated into said stem portion;

a second panel being structured to have a stem portion extending downwardly from a knob portion, said second panel having a shaft channel being integrated into said stem portion of said second panel, said second panel being attachable to said first panel such that said first panel and said second panel define a gear shift knob, said shaft channel in said first panel being aligned with said shaft channel in said second panel when said first panel is attached to said second panel such that said shaft channel in said first panel and said shaft channel in said second panel defines a hole wherein said hole is configured to insertably receive a gear shift shaft of a vehicle thereby facilitating said knob portion of said first panel and said knob portion of said second panel to be gripped by a driver of the vehicle for shifting gears; and a magnet being integrated into said first panel and said second panel when said first panel is attached to said second panel, said magnet magnetically engaging a personal electronic device when said personal electronic device is placed on top of said gear shift knob defined by said first panel and said second panel wherein said magnet is configured to facilitate said personal electronic device to be visible to a driver of the vehicle wherein:

said first panel has a first lateral surface, a first recess extending into said first lateral surface, and a second recess extending into said first lateral surface;

said second panel has a primary lateral surface, a primary recess extending into said primary lateral surface, and a secondary recess extending into said primary lateral surface;

said device includes a pair of washers, each of said washers having an opening which has a bounding surface being threaded;

said pair of washers includes a first washer and a second washer;

said first washer is positioned in said first recess in said first panel and said primary recess in said second panel when said first panel is attached to said second panel having said opening in said first washer being aligned with a hole defined by said shaft channel in each of said first panel and said second panel; and said second washer is positioned in said second recess in said first panel and said secondary recess in said second panel when said first panel is attached to said second panel having said opening in said second washer being aligned with said opening in said first washer.

2. The device according to claim 1, wherein:

said first panel has a second lateral surface and an outer surface extending between said first lateral surface and said second lateral surface;

said outer surface has a lower side being perpendicularly oriented with each of a first front side and a back side such that lower side and said first front side and said back side defines said stem portion;

said outer surface has a first angled side sloping upwardly between said first front side and a second front side of said outer surface;

said second front side lies on a plane being oriented parallel to said first front side;

said outer surface has a second angled side angling upwardly between said back side and a top side of said outer surface;

said second front side intersects said top side such that said second front side is perpendicularly oriented with said top side; and said first angled side and said second front side and said top side and said second angled side define said knob portion.

3. The device according to claim 2, wherein:

said shaft channel is recessed into said first lateral surface;

said shaft channel extends from said lower side toward said knob portion;

said shaft channel is centrally positioned between said first front side and said back side; and said shaft channel has a bounding surface being concavely arcuate with respect to said first lateral surface.

4. The device according to claim 2, wherein:

said first recess intersects said shaft channel at a point being spaced from a terminal end of said shaft channel;

said first recess has a width being greater than a width of said shaft channel; and said first recess has a bounding surface being concavely arcuate with respect to said first lateral surface.

5. The device according to claim 4, wherein:

said second recess intersects said terminal end of said shaft channel such that said second recess is oriented parallel to said first recess; and said second recess has a bounding surface being concavely arcuate with respect to said first lateral surface.

6. The device according to claim 2, wherein said first panel has a well extending into said first lateral surface, said well being positioned closer to said top side of said outer surface than said second recess, said well being oriented to extend along a line being oriented parallel to said top side.

7. The device according to claim 2, wherein said first panel has a plurality of fastener wells extending into said first lateral surface, said plurality of fastener wells being spaced apart from each other and being distributed around said outer surface, each of said plurality of fastener wells having a bounding surface being threaded.

8. The device according to claim 1, wherein:

said second panel has a secondary lateral surface and an outside surface extending between said primary lateral surface and said secondary lateral surface;

said outside surface has a bottom side being perpendicularly oriented with each of a primary front side and a rear side such that bottom side and said primary front side and said rear side defines said stem portion of said second panel;

said outside surface has a primary angled side sloping upwardly between said primary front side and a secondary front side of said outside surface, said secondary front side lying on a plane being oriented parallel to said primary front side;

said outside surface has a secondary angled side angling upwardly between said rear side and an upper side of said outside surface;

said secondary front side intersects said upper side such that said secondary front side is perpendicularly oriented with said upper side; and said primary angled side and said secondary front side and said upper side and said secondary angled side define said knob portion of said second panel.

9. The device according to claim 8, wherein:

said shaft channel is recessed into said primary lateral surface;

said shaft channel extends from said bottom side toward said knob portion of said second panel;

said shaft channel is centrally positioned between said primary front side and said rear side; and said shaft channel has a bounding surface being concavely arcuate with respect to said primary lateral surface.

10. The device according to claim 8, wherein:

said primary recess intersecting said shaft channel in said second panel at a point being spaced from a terminal end of said shaft channel;

said primary recess has a width being greater than a width of said shaft channel in said second panel; and said primary recess has a bounding surface being concavely arcuate with respect to said primary lateral surface.

11. The device according to claim 10, wherein:

said secondary recess intersects said terminal end of said shaft channel in said second panel such that said secondary recess is oriented parallel to said primary recess; and said secondary recess has a bounding surface being concavely arcuate with respect to said primary lateral surface.

12. The device according to claim 11, wherein said second panel has a well extending into said primary lateral surface, said well in said second panel being positioned closer to said upper side of said outside surface than said secondary recess, said well in said second panel being oriented to extend along a line being oriented parallel to said upper side.

13. The device according to claim 12, wherein:

said first panel has a well extending into said first lateral surface;

said first lateral surface of said first panel rests against said primary lateral surface of said second panel when said first panel is attached to said second panel;

said primary recess is aligned with said first recess when said first panel is attached to said second panel;

said secondary recess is aligned with said second recess when said first panel is attached to said second panel; and said well in said first panel is aligned with said well in said second panel when said first panel is attached to said second panel.

14. The device according to claim 8, wherein:

said first panel has a plurality of fastener wells;

second panel has a plurality of first fastener wells extending into said primary lateral surface, said plurality of first fastener wells being spaced apart from each other and being distributed around said outside surface, each of said first fastener wells being aligned with a respective one of said fastener wells in said first panel when said first panel is attached to said second panel; and said second panel has a plurality of second fastener wells extending into said secondary lateral surface, each of said second fastener wells intersecting a respective one of said first fastener wells, each of said second fastener wells having a diameter being greater than a diameter of said respective first fastener well.

15. The device according to claim 14, wherein:

said device includes a plurality of fasteners, each of said plurality of fasteners having a shaft being threaded and a head;

said shaft associated with each of said plurality of fasteners threadably engages a bounding surface of a respective one of said plurality of fastener wells in said first panel when said plurality of fasteners is extended through a respective pair of said second fastener wells and said first fastener wells; and said head associated with each of said plurality of fasteners abuts a threshold between said respective pair of said second fastener well and said first fastener well thereby compressing said second panel against said first panel.

16. The device according to claim 1, wherein:

said first panel has an outer surface which as a top side;

said first panel has a well extending into said first panel;

said second panel has an outside surface which has an upper side;

said second panel has a well extending into said second panel; and said magnet is positioned in said well in said first panel and said well in said second panel having said magnet lying on a plane being oriented parallel to said top side of said outer surface of said first panel and said upper side of said outside surface of said second panel.

17. A gearshift smartphone mount device for mounting a smartphone to a gearshift lever in an automobile, said device comprising:

a first panel being structured to have a stem portion extending downwardly from a knob portion, said first panel having a shaft channel being integrated into said stem portion, said first panel having a first lateral surface, a second lateral surface and an outer surface extending between said first lateral surface and said second lateral surface, said outer surface having a lower side being perpendicularly oriented with each of a first front side and a back side such that lower side and said first front side and said back side defines said stem portion, said outer surface having a first angled side sloping upwardly between said first front side and a second front side of said outer surface, said second front side lying on a plane being oriented parallel to said first front side, said outer surface having a second angled side angling upwardly between said back side and a top side of said outer surface, said second front side intersecting said top side such that said second front side is perpendicularly oriented with said top side, said first angled side and said second front side and said top side and said second angled side defining said knob portion, said shaft channel being recessed into said first lateral surface, said shaft channel extending from said lower side toward said knob portion, said shaft channel being centrally positioned between said first front side and said back side, said shaft channel having a bounding surface being concavely arcuate with respect to said first lateral surface, said first panel having a first recess extending into said first lateral surface, said first recess intersecting said shaft channel at a point being spaced from a terminal end of said shaft channel, said first recess having a width being greater than a width of said shaft channel, said first recess having a bounding surface being concavely arcuate with respect to said first lateral surface, said first panel having a second recess extending into said first lateral surface, said second recess intersecting said terminal end of said shaft channel such that said second recess is oriented parallel to said first recess, said second recess having a bounding surface being concavely arcuate with respect to said first lateral surface, said first panel having a well extending into said first lateral surface, said well being positioned closer to said top side of said outer surface than said second recess, said well being oriented to extend along a line being oriented parallel to said top side, said first panel having a plurality of fastener wells extending into said first lateral surface, said plurality of fastener wells being spaced apart from each other and being distributed around said outer surface, each of said plurality of fastener wells having a bounding surface being threaded;

a second panel being structured to have a stem portion extending downwardly from a knob portion, said second panel having a shaft channel being integrated into said stem portion of said second panel, said second panel being attachable to said first panel such that said first panel and said second panel define a gear shift knob, said shaft channel in said first panel being aligned with said shaft channel in said second panel when said first panel is attached to said second panel such that said shaft channel in said first panel and said shaft channel in said second panel defines a hole wherein said hole is configured to insertably receive a gear shift shaft of a vehicle thereby facilitating said knob portion of said first panel and said knob portion of said second panel to be gripped by a driver of the vehicle for shifting gears, said second panel having a primary lateral surface, a secondary lateral surface and an outside surface extending between said primary lateral surface and said secondary lateral surface, said outside surface having a bottom side being perpendicularly oriented with each of a primary front side and a rear side such that bottom side and said primary front side and said rear side defines said stem portion of said second panel, said outside surface having a primary angled side sloping upwardly between said primary front side and a secondary front side of said outside surface, said secondary front side lying on a plane being oriented parallel to said primary front side, said outside surface having a secondary angled side angling upwardly between said rear side and a upper side of said outside surface, said secondary front side intersecting said upper side such that said secondary front side is perpendicularly oriented with said upper side, said primary angled side and said secondary front side and said upper side and said secondary angled side defining said knob portion of said second panel, said shaft channel in said second panel being recessed into said primary lateral surface, said shaft channel in said second panel extending from said bottom side toward said knob portion of said second panel, said shaft channel in said second panel being centrally positioned between said primary front side and said rear side, said shaft channel in said second panel having a bounding surface being concavely arcuate with respect to said primary lateral surface, said second panel having a primary recess extending into said primary lateral surface, said primary recess intersecting said shaft channel in said second panel at a point being spaced from a terminal end of said shaft channel in said second panel, said primary recess having a width being greater than a width of said shaft channel in said second panel, said primary recess having a bounding surface being concavely arcuate with respect to said primary lateral surface, said second panel having a secondary recess extending into said primary lateral surface, said secondary recess intersecting said terminal end of said shaft channel in said second panel such that said secondary recess is oriented parallel to said primary recess, said secondary recess having a bounding surface being concavely arcuate with respect to said primary lateral surface, said second panel having a well extending into said primary lateral surface, said well in said second panel being positioned closer to said upper side of said outside surface than said secondary recess, said well in said second panel being oriented to extend along a line being oriented parallel to said upper side, said first lateral surface of said first panel resting against said primary lateral surface of said second panel when said first panel is attached to said second panel, said primary recess being aligned with said first recess when said first panel is attached to said second panel, said secondary recess being aligned with said second recess when said first panel is attached to said second panel, said well in said first panel being aligned with said well in said second panel when said first panel is attached to said second panel, second panel having a plurality of first fastener wells extending into said primary lateral surface, said plurality of first fastener wells being spaced apart from each other and being distributed around said outside surface, each of said first fastener wells being aligned with a respective one of said fastener wells in said first panel when said first panel is attached to said second panel, said second panel having a plurality of second fastener wells extending into said secondary lateral surface, each of said second fastener wells intersecting a respective one of said first fastener wells, each of said second fastener wells having a diameter being greater than a diameter of said respective first fastener well;

a plurality of fasteners, each of said plurality of fasteners having a shaft being threaded and a head, said shaft associated with each of said plurality of fasteners threadably engaging said bounding surface of a respective one of said plurality of fastener wells in said first panel when said plurality of fasteners is extended through a respective pair of said second fastener wells and said first fastener wells, said head associated with each of said plurality of fasteners abutting a threshold between said respective pair of said second fastener well and said first fastener well thereby compressing said second panel against said first panel;

a pair of washers, each of said washers having an opening which has a bounding surface being threaded, said pair of washers including a first washer and a second washer, said first washer being positioned in said first recess in said first panel and said primary recess in said second panel when said first panel is attached to said second panel having said opening in said first washer being aligned with said hole defined by said shaft channel in each of said first panel and said second panel, said second washer being positioned in said second recess in said first panel and said secondary recess in said second panel when said first panel is attached to said second panel having said opening in said second washer being aligned with said opening in said first washer; and a magnet being integrated into said first panel and said second panel when said first panel is attached to said second panel, said magnet magnetically engaging a personal electronic device when said personal electronic device is placed on top of said gear shift knob defined by said first panel and said second panel wherein said magnet is configured to facilitate said personal electronic device to be visible to a driver of the vehicle, said magnet being positioned in said well in said first panel and said well in said second panel having said magnet lying on a plane being oriented parallel to said top side of said outer surface of said first panel and said upper side of said outside surface of said second panel.

* * * * *